Dec. 15, 1931.  J. BRUEL  1,836,107

SAFETY HOOK FOR HOISTING MACHINES

Filed Jan. 5, 1931

Inventor
Jean Bruel
By B. Singer

Patented Dec. 15, 1931

1,836,107

UNITED STATES PATENT OFFICE

JEAN BRUEL, OF CLICHY, FRANCE

SAFETY HOOK FOR HOISTING MACHINES

Application filed January 5, 1931, Serial No. 506,820, and in France January 11, 1930.

This invention relates to improvements in safety hooks for hoisting machines and more especially to hooks provided with locking latches, tongues or the like which serve to prevent casual detachment of the load supporting means from the hook; the object being to effect improvements in the construction of the hook and of the locking device, the invention consisting in the construction, combination and arrangement of devices hereinafter described and claimed.

The drawings annexed show, diagrammatically and merely in the way of examples two embodiments of the subject-matter of the invention.

The flat hook $a$ is provided at its upper end with a head $a'$ which has a nose $a_3$. The nose $a_2$ of the hook is at its lower end. At both sides of the hook are flat locking fingers $b$ pivotally connected near their upper extremities to a rear point $c$ of the head $a'$ and also provided at their upper ends with extensions or arms $d$ connected to each other by a sleeve $e$.

The rope or chain of the hoisting machine attaches itself by a stirrup, link or otherwise to the arms $d$ of the fingers $b$, for example to the cross-piece or sleeve $e$. (Figs. 1, 2.)

On tensioning the rope or chain, the sleeve $e$ abuts against the lower part of the nose $a_3$ so that the load is transmitted through the medium of this sleeve from the nose $a_3$ to the rope or chain of the hoisting machine. The supporting surface between the sleeve $e$ and the nose $a_3$ can be flat or arched.

The hook is so shaped that when unloaded (Fig. 2) the bottom $f$ of the hook is substantially in the same vertical line as the axis of the sleeve $e$.

Figure 1:
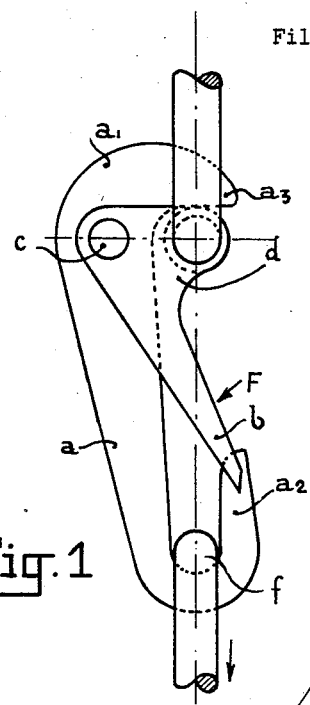
Fig. 1 represents, as the first embodiment, a hook in its closed position, in elevation.
Figure 2:
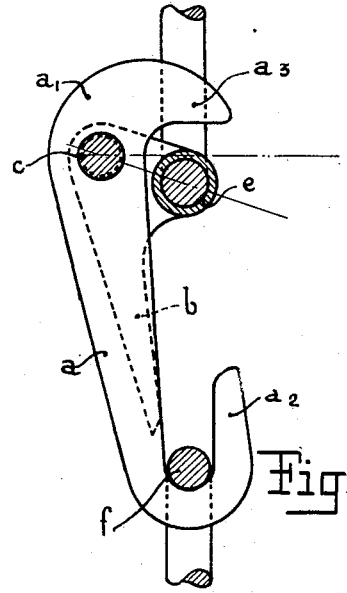
Fig. 2 shows the same, partly in section, in its open position, the front pawl being consequently removed.

Fig. 1 shows that when the rope or chain is tensioned, the pawls $b$ cannot move in the direction F and hence all possibility of casual detachment of the lifting member $f$ from the hook is dispensed with.

When the hook passes over a pulley the contact cannot occasion an opening of the hook because the nose $a_3$ prevents all pressure upon the locking fingers.

Finally, when the load, on descending, touches the soil, owing to the weight proper of the hook, the fingers remain in their raised positions, the sleeve $e$ abuts below the nose $a_3$ and the fingers cannot get higher than shown and the ring or lifting member $f$ of the load forces itself between the parts $b$ and $a$ and prevents all possibility of opening of the hook.

The fingers can be connected to each other also near their lower extremities by means of a bridge $b_1$ limiting the extent of oscillating movement of the fingers $b$ at the opening of the hook and facilitating the opening.

Figure 3:
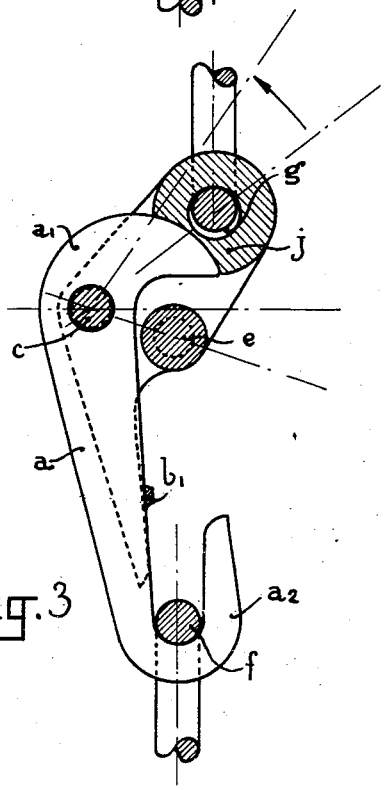
Fig. 3 represents the second embodiment in a view similar to Fig. 1.
Figure 4:
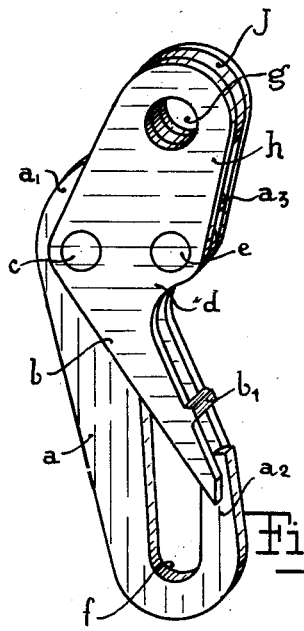
Fig. 4 shows the same hook, closed, in perspective.

According to the embodiment shown in Figs. 3 and 4 the rope or chain of the hoisting machine is attached to a point different from the sleeve $e$, for example to a point $g$ situated higher than the nose $a_3$ and outside of the hook, this point $g$ being normally situated (Fig. 4) vertically above $f$.

For this purpose the lugs $d$ continue into extensions $h$ projecting upwardly and connected to each other above the head $a_1$ by a piece $j$.

The rope or chain of the hoisting machine is attached to these extensions, at $g$.

The extent of oscillations of the pawls at opening the hook can be limited by means of suitably provided abutments one of them being provided on the head $a_1$ of the hook and the other on the cross-piece $j$. It is also possible and more simple, to use the border of the head $a_1$ eccentric with regard to the axis $c$, so as to obtain an abutment, as indicated in Fig. 3.

The invention is of course not limited to the two embodiments described and shown, and permits numerous modifications both with regard to the general arrangement and to the details, without departing from its scope.

What I claim, is:

1. A safety hook for hoisting devices, having a bill at the lower end and a nose at the upper end extending from the same side of the hook as the bill and a locking finger pivotally connected to the upper portion of the hook and adapted to close against the bill, said finger having a laterally extending portion at its upper end arranged for the attachment of a hoisting cord thereto and having means to close against the under side of the nose.

2. A hook of the class described, having a bill at its lower end and a nose at its upper end extending from the same side of the hook as the bill, a pair of locking fingers arranged one on each side of the hook and pivotally connected at their upper ends to the upper portion of the hook, the said fingers having laterally extending portions at their upper ends arranged for the attachment of a hoisting cord thereto and being provided with connecting means between said extensions to bear against the under side of the nose when the fingers are in position to close against the bill.

In witness whereof I affix my signature.

JEAN BRUEL.